United States Patent [19]

Eckle et al.

[11] 4,067,251
[45] Jan. 10, 1978

[54] FACING AND INSIDE-TURNING HEAD

[75] Inventors: Otto Eckle; Paul Winger, both of Loechgau, Germany

[73] Assignee: Komet Stahlhalter-und Werkzeugfabrik Robert Breuning GmbH, Besigheim, Germany

[21] Appl. No.: 767,166

[22] Filed: Feb. 9, 1977

[30] Foreign Application Priority Data

Mar. 4, 1976 Germany .............................. 7606473

[51] Int. Cl.² ........................ B23B 41/00; B23B 51/00
[52] U.S. Cl. ........................................ 82/1.2; 408/147
[58] Field of Search ..................... 82/1.2; 408/147, 152

[56] References Cited
U.S. PATENT DOCUMENTS 2,867,139  1/1959  Caldwell ................................. 82/1.2
3,067,637  12/1962  Horning ................................. 82/1.2

Primary Examiner—Harrison L. Hinson
Attorney, Agent, or Firm—Blanchard, Flynn, Thiel, Boutell & Tanis

[57] ABSTRACT

The invention relates to a facing and inside-turning head comprising a supporting body to be fixed by its back to the spindle of a turning machine, a slide shiftable radially at the front of the supporting body in a guide extending perpendicularly and symmetrically with respect to the axis of rotation, to which slide a tool holder can be fixed, and an adjusting rod slidable in the supporting body coaxially with the axis of rotation and the axial movement of which produces a radial movement of the slide via an interposed drive along with a counter weight also actuatable by the interposed drive.

6 Claims, 2 Drawing Figures

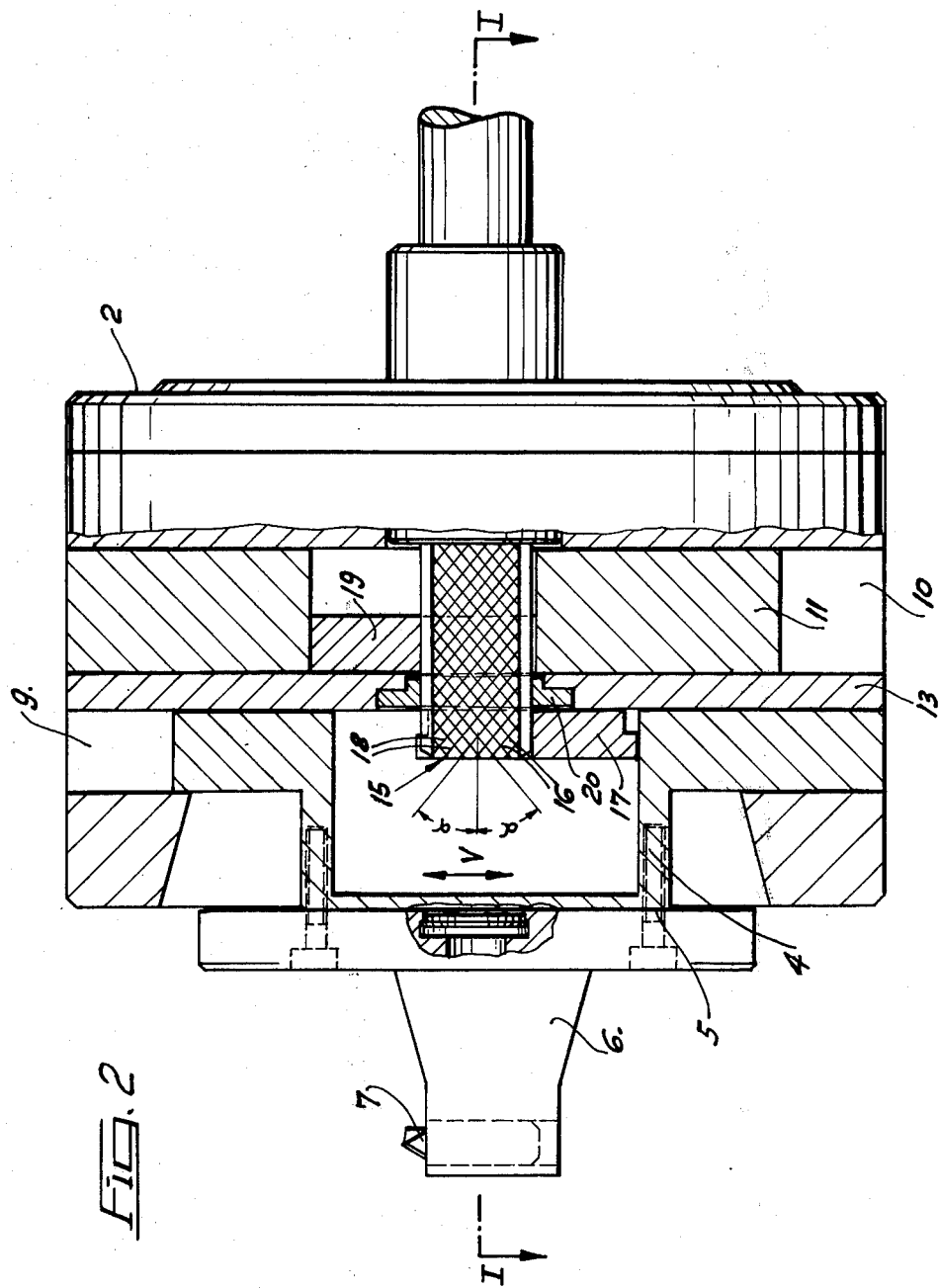

FACING AND INSIDE-TURNING HEAD

A facing and inside-turning head is a structural unit, the generally cylindrical supporting body of which is flanged onto the spindle of a turning or special machine. Such machines generally have in their spindle a rod movable axially hydraulically which can be connected to the adjusting rod of the facing and inside-turning head. By axial shifting of the rod and the adjusting rod, the slide of the facing and inside-turning head can be shifted radially. If the tool holder has tools in the form of turning-tool cutting edges and if, during the rotation of the facing and inside-turning head, the slide is extended radially, face machining takes place at the workpiece. In similar manner, for example, internal grooves can also be cut out. With the slide at rest and relative shifting of the workpiece with respect to the turning head in the axial direction of the latter, inside turning or machining by boring takes place. If this relative shifting is combined with a simultaneous radial shifting of the slide, the tool performs a three-dimensional movement and produces at the workpiece a shape which, for example, may be a cone.

In the facing and inside-turning heads having a slide which have been known heretofore, there is only one position of the slide in which the mass centre of gravity of the slide, tool holder and tool coincides with the axis of rotation of the facing and inside-turning head. On radial shifting of the slide, the mass centre of gravity moves away from the axis of rotation, whereby an unbalance is created which is all the greater the further the slide is extended radially outwards. This unbalance, however, impairs the working accuracy. Were the slide, the tool holder and the tool to be designed as light and small as possible in order to keep the unbalance as small as possible, these parts would not have the necessary stability, whereby the precision of machining would likewise suffer.

In addition to facing and inside-turning heads having only one slide, heads of this kind are also known which have two slides moving in opposite directions, whereby any unbalance is avoided. The two slides are arranged to be movable parallel to one another in a radial plane. The dividing line of the two slides coincides with a diameter of the front of the supporting body. This has the disadvantage that only a narrow and eccentrically located clamping or mounting surface is available for all tool holders to be fixed to the slides and this clamping surface does not make stable fixing of the tool holders possible. Owing to the eccentric arrangement of the tool holders and the centrifugal forces acting on them, tilting forces are exerted on a given slide, which results in unfavourable frictional forces in the guides of the slides. It is also a disadvantage that in facing and inside-turning heads of this kind having two slides each of the two slides can be driven only on one side by the adjusting rod, if a helical toothing on the adjusting rod and a corresponding rack with helical teeth on the slides are employed as the drive. Consequently, the actuating force also acts on the slider on one side and eccentrically.

The problem underlying the invention is to provide a facing and inside-turning head of the kind mentioned at the beginning in which, while retaining a single slide arranged symmetrically with respect to the axis of rotation, any unbalance is avoided and the precision of machining is increased.

According to the invention, this is achieved in that between the back of the supporting body and the slide guide another guide extending axially offset and parallel with respect to the slide guide is provided in which a counterweight corresponding substantially in its mass to the mass of the slide, including the tool holder and tool, is radially slidable, and that between the adjusting rod and counterweight another drive is provided which, on actuation of the adjusting rod, produces a radial movement of the counterweight of equal extent, but of opposite direction, with respect to the slide.

Due to the arrangement of the slide and the counterweight one behind the other as seen in the axial direction, the result obtained in the first place is that the slide can be designed completely independent of the counterweight. As has been the case heretofore with a facing and inside-turning head with only one slide, this slide can be formed completely symmetrically with respect to the axis of rotation transversely of its sliding direction and can have a wide clamping surface for the tool holders which extends symmetrically with respect to the axis of rotation and also to the longitudinal axis of the slide. The advantages which facing the inside-turning heads with only one slide have compared with such heads having two slides are therefore retained in the facing and inside-turning head according to the invention. At the same time, however, the static unbalance of the slide is compensated in all positions thereof by the counterweight slidable in the opposite direction, the mass of which corresponds substantially to the mass of the slide plus the mass of the parts carried by it. The precision of machining is thereby very substantially increased, especially as in the elaboration of the slide, the tool holder and the tool regard no longer has to be paid to their mass. These parts can be designed to be sufficiently stable in accordance with the particular requirements. Moreover, it is possible to drive the slide via a helical toothing on both sides of the adjusting rod, so that the actuating force acts on the slide centrally and it can be shifted easily and with low wear.

Further advantageous developments of the invention are characterized in the sub-claims.

The invention is described in detail hereinafter with reference to an embodiment shown in the drawing.

In the drawing

FIG. 2 is another axial section on the line II—II of FIG. 1.

Figure 1:
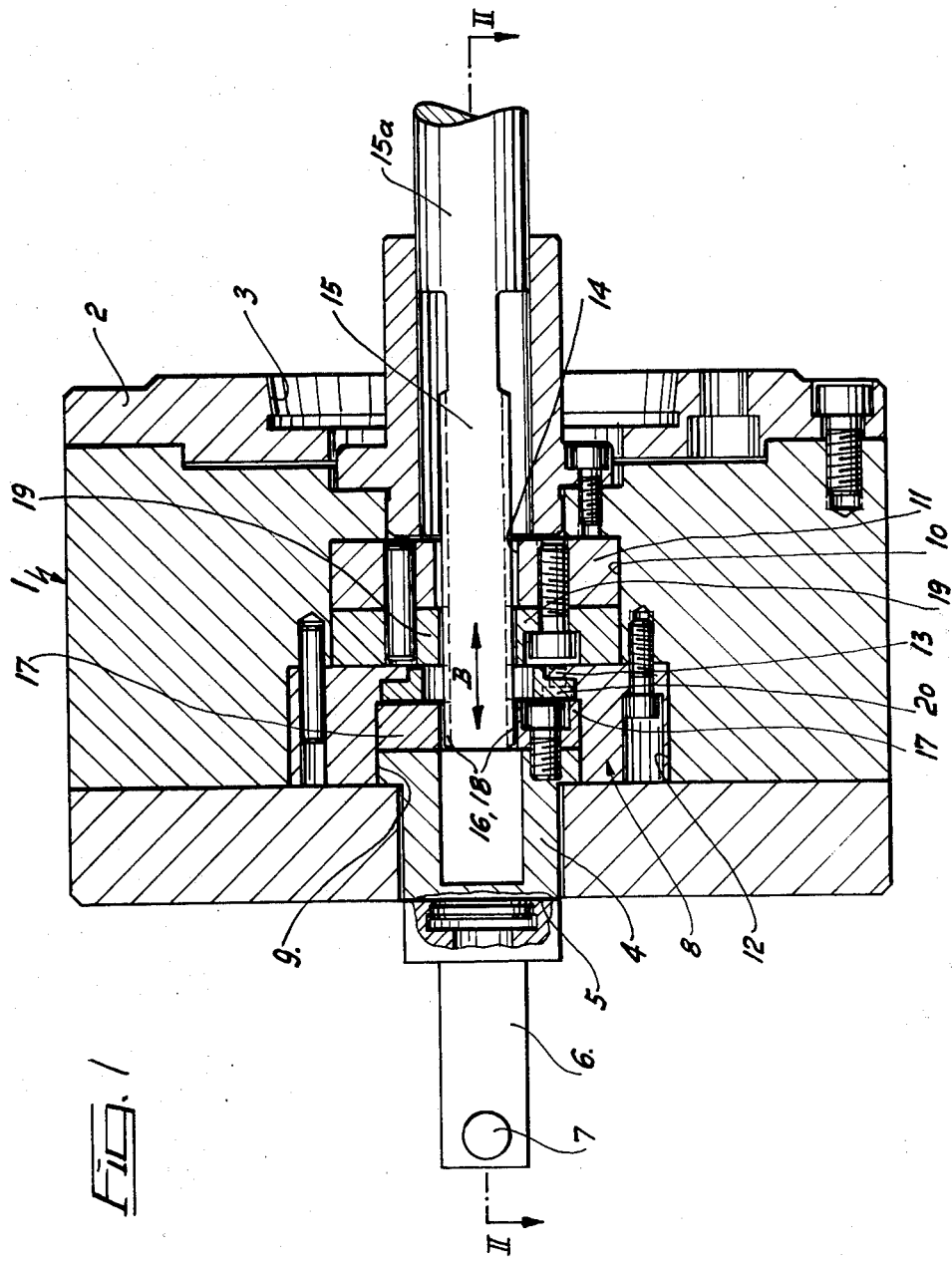
FIG. 1 is an axial section through the facing and inside-turning head on the line I—I of FIG. 2.

In the drawing, the reference 1 designates the cylindrical supporting body of the facing and inside-turning head, which may consist of a plurality of parts. This supporting body has at its back a flange plate 2 with a conical recess 3 which fits over the spindle of a turning or special machine, this spindle being designed, for example, in accordance with DIN 55021. The supporting body 1 can be fixed to the spindle by means of the flange plate 2.

At the front of the supporting body 1, a slide 4 is arranged to be slidable in the direction V perpendicularly to the axis of rotation A of the supporting body, which coincides with the axis of the spindle. The plane of symmetry of the slide, which extends in its longitudinal direction, passes through the axis of rotation A. The slide 4 has a wide clamping surface 5 at its front for a tool holder 6 and, depending on the nature of the machining to be carried out, this tool holder may carry, for example, an inside-turning or boring tool 7 or else a facing tool (not shown).

A guide bar 8 mounted in the supporting body and of substantially U-shaped cross section serves to guide the slide. The U-shaped recess 9 of the guide bar 8, which is open towards the front of the supporting body 1, serves for mounting the slide 4. Between the back of the supporting body formed by the flange plate 2 and the slide guide 8, 9 there is provided another guide 10 which is axially offset and extends parallel to the slide guide 8, 9, the said guide 10 being formed in the embodiment shown in the drawing by a U-shaped recess in the supporting body 1. A counterweight 11 is arranged to be slidable in this U-shaped recess parallel, but in the opposite direction, to the slide 4. The mass of this counterweight 11, including the parts connected thereto, which will be gone into in detail later on, corresponds substantially to the mass of the slide 4 plus all the parts connected to it, such as the tool holder 6 and the tool 7. The guide bar 8, which is inserted into an extension 12 of the U-shaped recess 10, forms with its base 13 the front guide surface for the counterweight 11. The counterweight 11 moreover has a slot 14 extending parallel to its sliding direction and through which the adjusting rod 15 passes. The adjusting rod 15, which can be connected by its rear end 15a to a rod (not shown) in the spindle of the machine tool, is shiftable in the axial direction B. The adjusting rod 15 has a first helical toothing which meshes with a corresponding rack 17 connected to the slide 4. Advantageously, the adjusting rod 15 is provided with a toothing 16 of this kind on two diametrically opposite sides, each of these toothings co-operating with a rack 17, as can be seen from FIG. 1. The adjusting rod 15, however, further comprises a second toothing 18, the teeth of which are inclined with respect to the sliding direction B of the adjusting rod at the same angle α as, but in the opposite direction to, the teeth of the first helical toothing 16. The teeth of the two helical toothings 16 and 18 cross. The second helical toothing 18, which may likewise be provided on both sides of the adjusting rod 15, co-operates with two racks 19 provided symmetrically with respect to the adjusting rod 15 and connected in their turn to the counterweight 11. In this way, on shifting of the adjusting rod 15 in the axial direction, the slide 4 and the counterweight 11 are caused to be moved at any given time by the same amount, but always in opposite directions. Since the racks 17 and 19 are arranged symmetrically with respect to the adjusting rod 15 in each case, the driving forces act centrally and symmetrically on the slide 4 and the counterweight 11 at any given time. Transverse forces acting on the slide, counterweight and adjusting rod on one side are eliminated.

A guide bush 20 for the adjusting rod 15 is provided with advantage in the base 13 of the guide bar 8. As a result of this supplementary guiding of the adjusting rod, the transfer of force between the adjusting rod and the slide 4 operates with a very low degree of play and forces a very precise consequential accuracy on the latter.

A facing and inside-turning head of the kind according to the invention is particularly suitable for copy turning purposes for machining high precision parts at high rotational speeds. Due to the elimination of the unbalance of the slide by means of the counterweight, the facing and inside-turning head according to the invention operates very smoothly and accurately in all positions of the slide, even at high rotational speeds.

What we claim is:

1. Facing and inside-turning head comprising a supporting body to be fixed by its back to the spindle of a turning machine or the like, a slide shiftable radially at the front of the supporting body in a guide extending perpendicularly and symmetrically with respect to the axis of rotation, to which slide a tool holder can be fixed, and an adjusting rod slidable in the supporting body coaxially with the axis of rotation and the axial movement of which produces a radial movement of the slide via an interposed drive, comprising the improvement wherein between the back of the supporting body and the side guide another guide extending axially offset and parallel with respect to the slide guide is provided in which a counterweight corresponding substantially in its mass to the mass of the slide, including the tool holder and tool, is radially slidable, and wherein between the adjusting rod and counterweight another drive is provided which, on actuation of the adjusting rod, produces a radial movement of the counterweight of equal extent, but of opposite direction, with respect to the slide.

2. Turning head according to claim 1, wherein the counterweight has a slot extending parallel to its sliding direction through which the adjusting rod is passed.

3. Turning head according to claim 1, wherein the adjusting rod has a helical toothing meshing with a corresponding rack connected to the slide, another helical toothing being provided on the adjusting rod the teeth of which toothing are inclined with respect to the axial direction of the adjusting rod at the same inclination α as, but in the opposite direction to, the teeth of the first helical toothing and mesh with another rack provided on the counterweight.

4. Turning head according to claim 3, wherein the adjusting rod has both toothings on two diametrically opposite sides and their teeth cross, and the slide and the counterweight each have two racks 5. Turning head according to claim 1, wherein the guide for the counterweight is formed by a U-shaped recess in the supporting body, to which recess there is adjacent, towards the front and in front of the counterweight, an extension in which is inserted a substantially U-shaped guide bar forming in turn with its base the front guide surface for the counterweight and having at its front side facing away from the counterweight a U-shaped recess as a guide for the slide.

6. Turning head according to claim 1, wherein a guide bush for the adjusting rod is arranged in the base of the guide bar.

* * * * *